United States Patent [19]

Miya

[11] Patent Number: 4,925,682
[45] Date of Patent: May 15, 1990

[54] METHOD AND DEVICE FOR ROASTING COFFEE BEANS

[75] Inventor: Isamu Miya, Jawa-gun, Gunma-ken, Japan

[73] Assignee: Ai Shi Denshi Kogyo Kabushiki Kaisha, Higashi-Ogogata, Japan

[21] Appl. No.: 303,446

[22] Filed: Jan. 31, 1989

[30] Foreign Application Priority Data

Mar. 10, 1988 [JP] Japan ................................. 63-57282

[51] Int. Cl.$^5$ .................... B65D 81/34; A23F 5/04
[52] U.S. Cl. .................................. 426/87; 426/110; 426/113; 426/118; 426/126; 426/232; 426/251; 426/466; 426/523; 426/394; 426/395; 426/396; 99/323.5; 99/422; 99/426; 229/3.5 MF; 229/117.22; 229/120; 229/162; 229/903; 34/238

[58] Field of Search ................ 426/466–470, 426/472, 113, 110, 523, 594, 595, 432–434, 87, 118, 126, 232, 251, 394, 395, 396; 99/286, 450, 422, 342, 348, 323.5; 34/237, 238; 366/143, 144

[56] References Cited

U.S. PATENT DOCUMENTS

| 110,916 | 1/1871 | Houcke | 99/323.5 |
| 270,503 | 1/1883 | Stopple | 34/233 |
| 2,198,647 | 4/1940 | Wolcott | 99/422 |
| 2,618,258 | 11/1952 | Kroyer | 99/422 |
| 2,673,806 | 3/1954 | Colman | 426/110 |
| 2,951,765 | 9/1960 | Robson | 426/113 |
| 3,117,875 | 1/1964 | Burns et al. | 426/113 |
| 3,122,990 | 3/1964 | Fried | 426/113 |
| 3,135,614 | 6/1964 | Parisi et al. | 426/113 |
| 3,140,034 | 7/1964 | Wyman et al. | 426/111 |
| 3,158,491 | 11/1964 | Farrell et al. | 426/123 |
| 3,424,596 | 1/1969 | Sullivan | 426/113 |
| 3,472,417 | 10/1969 | Fox | 426/131 |
| 3,659,584 | 5/1972 | Doyle et al. | 426/113 |
| 3,782,976 | 7/1974 | Maier et al. | 426/110 |
| 4,094,633 | 6/1978 | Peterson et al. | 426/469 |
| 4,390,554 | 6/1983 | Levinson | 426/113 |
| 4,419,373 | 12/1983 | Opperman | 426/111 |
| 4,425,720 | 1/1984 | Elevitch | 99/443 C |
| 4,455,763 | 6/1984 | Elevitch | 426/113 |
| 4,461,420 | 7/1984 | Horvath | 426/113 |
| 4,529,089 | 7/1985 | Gasbarra | 426/113 |
| 4,592,914 | 6/1986 | Kuchenbecker | 426/118 |
| 4,762,056 | 8/1988 | Virag | 426/523 |

FOREIGN PATENT DOCUMENTS

| 216333 | 12/1956 | Australia | 426/111 |
| 2827461 | 1/1980 | Fed. Rep. of Germany | 99/422 |
| 2447150 | 9/1980 | France | 426/466 |
| 738104 | 10/1955 | United Kingdom | 426/113 |

OTHER PUBLICATIONS

Food Engineering, 9/57, p. 81.

Primary Examiner—Steven Weinstein
Attorney, Agent, or Firm—Oldham & Oldham

[57] ABSTRACT

A simple coffee bean roasting device as disclosed which can be used as a container to store coffee beans in an airtight condition and is also capable of roasting the coffee beans easily and quickly by use of a home-use gas heater. The coffee bean roasting device is simple in structure and it is composed of a container of aluminum foil, a cover of a transparent cellophane, and a handle.

13 Claims, 5 Drawing Sheets

METHOD AND DEVICE FOR ROASTING COFFEE BEANS

BACKGROUND OF THE INVENTION

1. Field of the Invention

The present invention relates to a device which can be used as a container for keeping coffee beans in a sealed manner and is also capable of roasting the coffee beans for home use simply and quickly by use of a gas heater, and a method for roasting the coffee beans using the same device.

2. Description of the Prior Art

Conventionally, there have been disclosed various kinds of coffee bean roasting devices for home use.

For example, the conventional roasting devices include devices using an electric heater such as those shown in Japanese Utility Model Publication No. 10465 of 1983, Japanese Patent Publication (Tokkai) No. 159478 of 1982 and the like, and a device using charcoal such as one shown in Japanese Utility Model No. 11832 of 1985.

However, all of the above-mentioned conventional devices are complicated in structure, are expensive, and are not able to roast the coffee beans simply.

Also, because the coffee beans to be roasted by the above-mentioned roasters are bought in a small quantity at a market, shop or the like, it can be said that the temperature and humidity control thereof when and after they are bought are not satisfactory. Hence, when the coffee beans are roasted by use of the above-mentioned prior art home-use roasters, the quality of the coffee beans is not uniform so that the quality of the coffee beans after roasting is not uniform.

SUMMARY OF THE INVENTION

The present invention aims at eliminating the drawbacks found in the above-mentioned prior art roasting devices.

Accordingly, it is an object of the invention to provide a device for roasting coffee beans and a method for roasting by use of the same device in which the temperature and humidity of the coffee beans when and after they are bought at a market can be controlled sufficiently and satisfactorily and the coffee beans can be roasted easily by use of a gas heater for home use.

In achieving the above object, according to the invention, the coffee beans are stored within a container formed of aluminum foil and the container is covered with a cover to seal the coffee beans, that is, the container can be kept and sold at the market in such condition and, after purchase of the container, a consumer has only to apply it directly onto the flame of the home-use gas heater to be able to roast the coffee beans in the container. Thanks to this, the humidity of the coffee beans before roasting can be controlled satisfactorily and also the coffee beans can be roasted with ease.

It is another object of the invention to provide a device for roasting coffee beans and a method for roasting by use of the same device in which the coffee beans can be roasted simply and to the taste of a consumer.

In order to attain this object, according to the invention, in the center of the above-mentioned cover there is provided cutout means for opening a ventilation hole, so that during roasting, by opening the ventilation hole, the smoke that will be generated within the container can be discharged externally through the opened ventilation hole. Also, according to the invention, the cover is formed of a transparent material so that the roasting condition of the coffee beans within the container can be observed from outside.

Further, there are arranged a plurality of radially extending ridges in the bottom portion of the container, so that, when the container is swung, the coffee beans present within the container can be rolled or reversed more easily and, thus, the whole coffee beans can be roasted uniformly. In addition, due to the provision of a ceramic coating on the internal surface of the container, the coffee beans can be roasted uniformly to the innermost parts thereof by far-infared rays generated from the ceramic coating.

It is still another object of the invention to provide a roasting device which is simple in structure and is inexpensive.

To accomplish this object, according to the invention, there is provided a roasting device which is composed of a container formed of aluminum foil, a cover provided on the upper edges of the container, and a handle.

In other words, due to no use of rigid materials such as an iron plate and the like, the device of the invention is light in weight, can be produced in a simple manner, and can be supplied at low costs and in large quantities.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Figure 1:
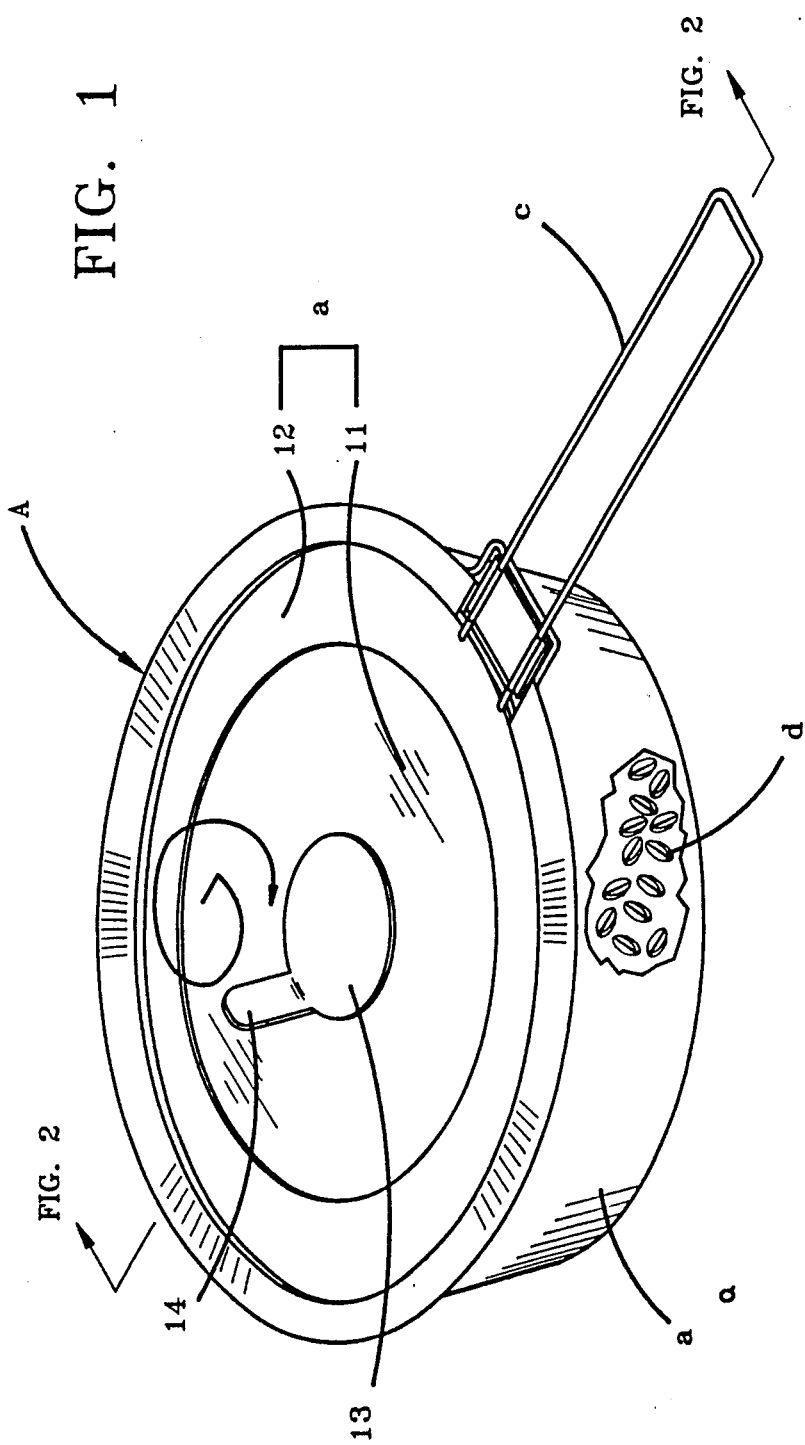
FIG. 1 is a perspective view of an embodiment of the invention, showing the states thereof before and during roasting.

Detailed description will be given hereunder of the preferred embodiment of a device for roasting coffee beans for home use simply by use of a gas heater, according to the present invention, with reference to the accompanying drawings.

In the drawings, (A) designates a device for simply roasting coffee beans (d) by use of a home-use gas heater, which device comprises a dish-shaped container (a), a cover (b) formed of a transparent, moistureproof cellophane, and a handle (c) mounted to the container (a). The container (a) includes a main body (a1) and a ceramic coating (a2) provided on the internal surface of the container main body (a1). The container main body (a1) is constructed of such a size that about 100 g of coffee beans (d), that is, a quantity of coffee beans for 10 persons or so, can be roasted. The illustrated main body is a dish-shaped body. comprising a circular body which has a diameter of 18 cm and a depth of 3 cm. This main body (a1) is formed by stamping aluminum foil.

The above-mentioned coffee beans (d) are raw beans or semi-roasted beans. Among the coffee beans (d), one or more beans pigmented with a food color are mixed as marking beans. In operation, the coffee beans (d) are roasted while observing the roasting condition of the marking coffee beans (d1).

Figure 5:
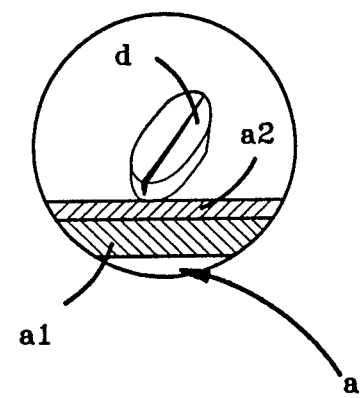
FIG. 5 is an enlarged section view of a part of a container according to the invention; and, FIG. 6 is a section view of the present device, illustrating the roasting condition thereof after roasting for a given period of time.

The above-mentioned ceramic coating (a2) is produced by applying ceramics such as alumina, zircon, cordierite or the like to the internal surface of the container main body (a1). The ceramic coating (a2) is arranged on the entire internal surface of the container main body (a1), as shown in FIG. 5.

Alternatively, however, according to the invention, a plurality of strip-shaped ceramic coatings may be arranged on the internal surface of the container main body (a1), for example, at intervals from one another. Within the container (a), there can be provided a portion which can be radiated alternately by the near and far infared rays. Also, because the coffee beans (d) are roasted while being stirred within the container (a) and, thus, the coffee beans (d) are moved within the container (a), the ceramic coating (a2) may be provided in part within the container (a).

Figure 3:
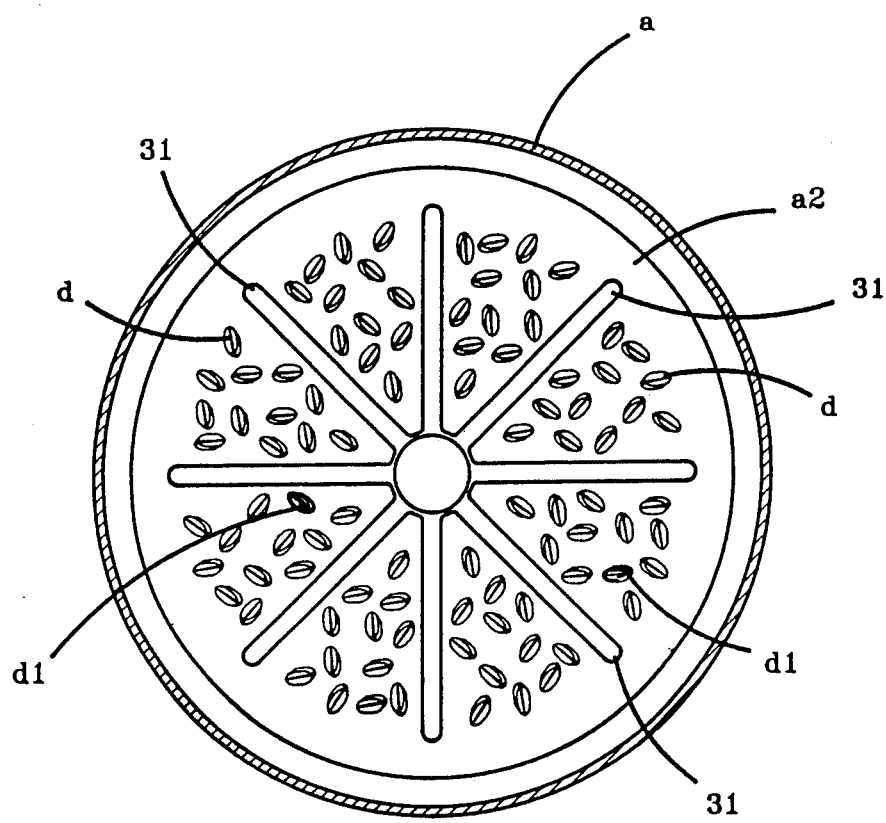
FIG. 3 is a section view taken along the line III—III in FIG. 2.

In the bottom portion of the container (a), as shown in FIG. 3, the aluminum foil is treated to provide ridges (31) which extend radially, so that, when oscillating the container (a), the coffee beans (3) can be reversed upside down and downside up, and, thus, the whole of the respective coffee beans (d) can be uniformly roasted.

The above-mentioned cover (b) is composed of an aluminum foil (12) integrally secured to the container (a) along the upper edges thereof and a transparent, moistureproof cellophane (11) bonded to the aluminum foil (12), so that the coffee beans present within the container (a) can be seen through the cellophane (11). Also, the aluminum foil (12) is arranged on the external peripheries of the cellophane (11) to thereby protect the cellophane (11) against breakage due to heat from the container (a).

A seal (13) having an integral pull member (14) is integrally bonded to the central portion of the cover (b) and, thus, if the pull member (14) is pulled, then the portion of the cellophane to which the seal (13) is bonded can be cut out together with the seal (13), thereby opening a ventilation hole (13).

Figure 2:
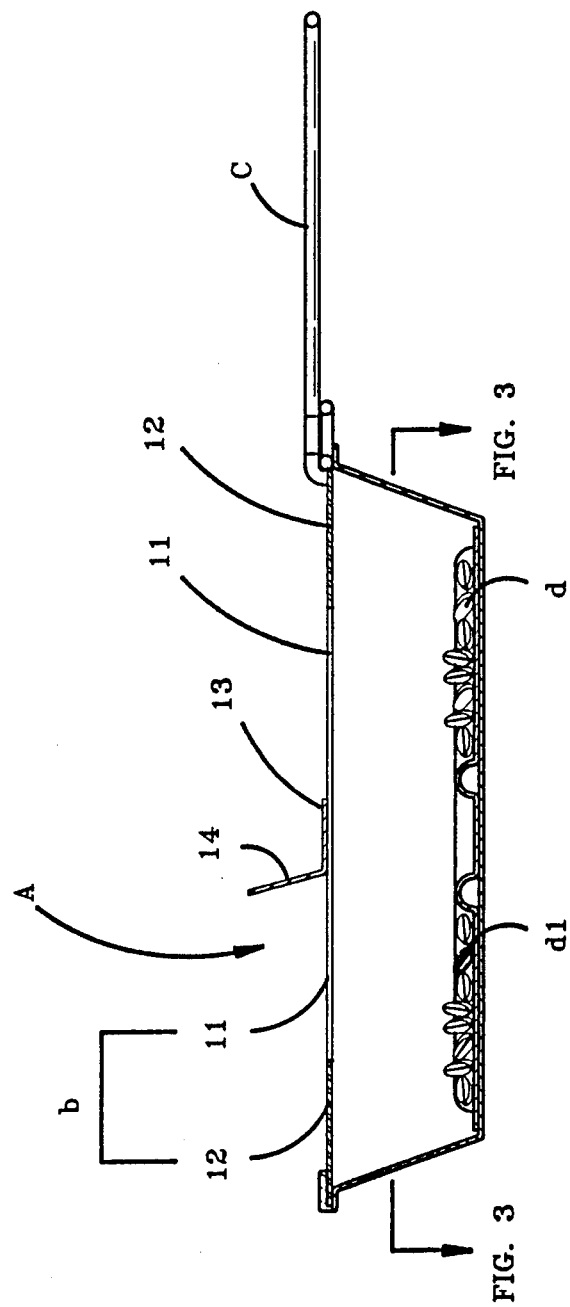
FIG. 2 is a section view taken along the line II—II in FIG. 1.
Figure 4:
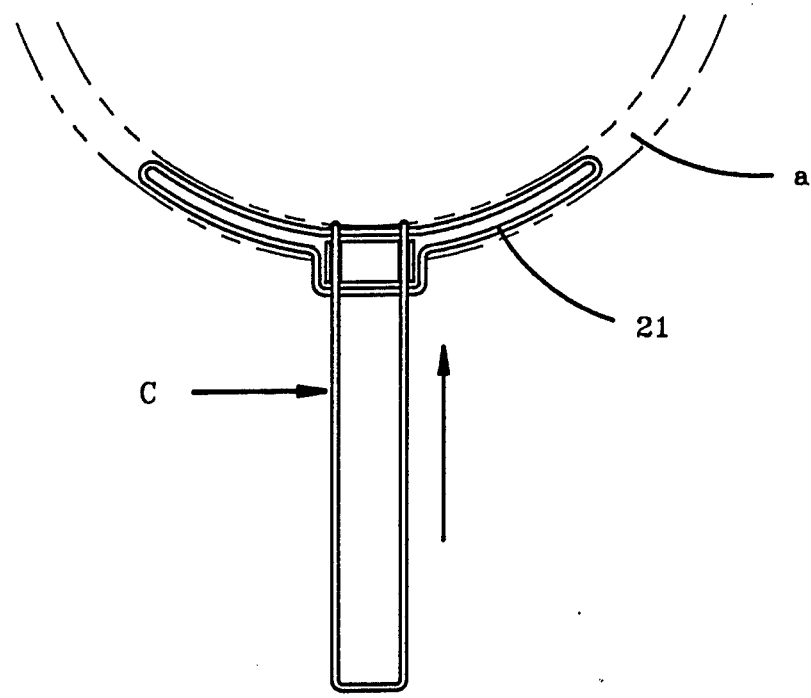
FIG. 4 is a plan view of a handle portion of the present device.

The handle (c) is mounted to a reinforcing core member (21) which is formed by bending a wire in a substantially u-shaped manner and is mounted within the upper edge of the container (a), in such a manner that it can be moved in the direction of an arrow, as shown in FIG. 4. As can be seen in FIGS. 1, 2 and 4, the handle (c) can be pulled or slid out when roasting the coffee bean, yet before roasting, the handle (c) is moved or slid in over the cover (b) so that it does not extend externally of the container (a).

The coffee beans that have already been semi-roasted are roasted in the following method by use of the before-mentioned simple roasting device (A).

At first, the above-mentioned coffee beans are previously stored in the container (a) which is covered with the cover (b) in an airtight manner, and are then sold to a consumer or a user. Then, at home, the coffee beans (d) are roasted for three minutes or so while mixing or rolling them by swinging the container (a) in the direction of an arrow shown in FIG. 1 over the strong flame of a gas heater such as is commonly used at home. In this operation, it is preferred that the container (a) may be spaced 2 cm or so apart from the strong flame of the gas heater. When the coffee beans (d) have changed color due to 3 to 4 minutes roasting, then the container (a) is further moved up to a position which is 5 or 6 cm apart from the heater flame and is further swung in the direction of the shown arrow. Then, after about 4 to 5 minutes, the coffee beans will burst, generating bursting sounds.

Figure 6:
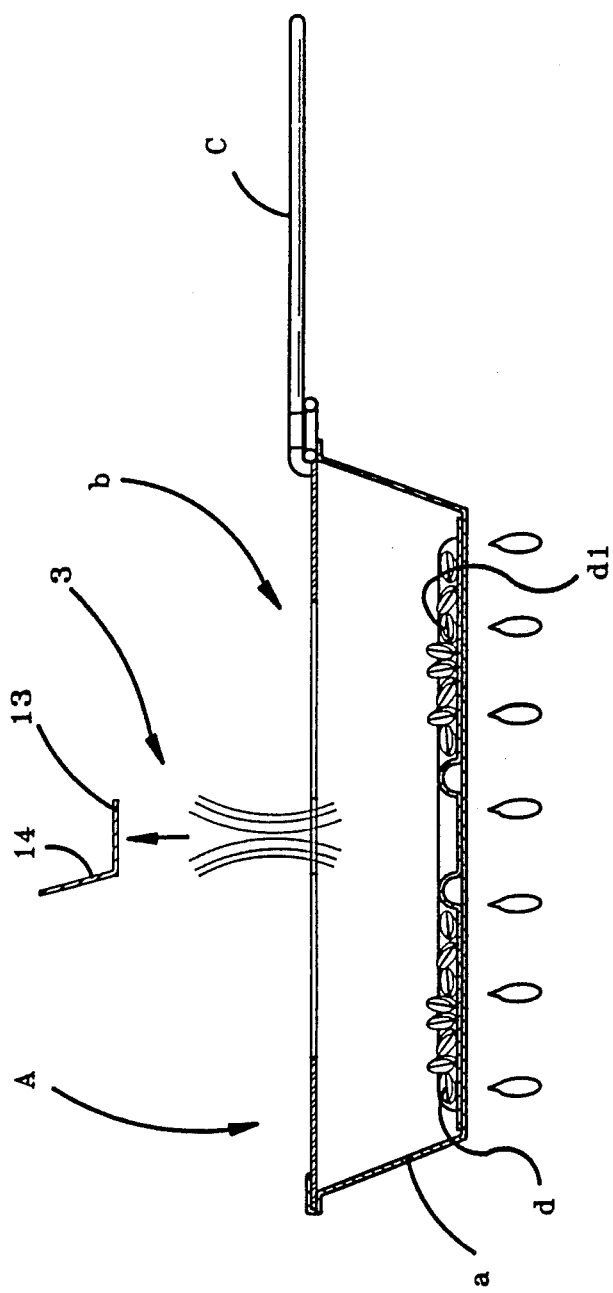

After that, the pull member (14) is pulled to thereby cut out the seal (13) bonded integrally with the cover (b). This cutout of the seal (13) opens the ventilation hole (13), so that as shown in FIG. 6, smoke and the like generated within the container (a) can be discharged through the ventilation hole (3).

The roasting of the coffee beans continues while swinging the container (a).

The above-mentioned roasting operation is carried out while observing the marking coffee beans (d1) until the coffee beans turn to the user's desired color. After completion of roasting, the ventilation hole (3) is enlarged and the roasted coffee beans are taken out onto a plate or the like. After the roasted coffee beans cool, the coffee beans are ground to powder by use of a coffee mill or the like for drinking.

As discussed before, by using previously semi-roasted coffee beans, the astringent coats and other unfavorable parts of the coffee beans have been removed, so that the resulting coffee has no bitter taste. After use, the container (a) and the like are to be thrown away.

As described hereinbefore, according to the invention, since the roasting device serves as a storage container of coffee beans, the quality of the coffee beans before roasting can be controlled in a sufficient and satisfactory manner so that all of the coffee beans can be roasted uniformly.

Also, because the roasting device of the invention is quite simple in structure, it can be manufactured at low costs and the coffee beans can be roasted very easily.

It should be understood,however, that there is no intention to limit the invention to the specific forms disclosed, but on the contrary, the inventions to cover all modifications, alternate constructions and equivalents falling within the spirit and scope of the invention as expressed in the appended claims.

What is claimed is:

1. A device for simply roasting coffee beans, said device comprising:

an imperforate dish-shaped container of aluminum foil and raw or semi-roasted coffee beans requiring further roasting contained therein; said container having a plurality of upwardly raised ridges in the bottom surface thereof substantially the height of the coffee beans so as to assist in turning the beans upon shaking the container;

a handle mounted to said container;

an imperforate cover air-tightly secured to the upper edge of said container hermetically covering said coffee beans;

said cover including an annular-shaped peripheral portion formed of aluminum foil and a central portion formed of transparent material and bonded to said annular-shaped peripheral portion so that said coffee beans in said container can be observed during coasting, said cover further including cutout means disposes in said central portion for opening a ventilation hole to discharge the smoke that is generated in roasting, said cutout means being integrally formed with said cover and including an integral pull member to assist in effecting removal of said cutout means therefrom;

and one or more additional coffee beans that have been previously pigmented and mixed with said raw or semi-roasted coffee beans as marking beans to permit easy observation of the state of agitation of said coffee beans.

2. A device for simply roasting coffee beans as set forth in claim 1, wherein a reinforcing core member is arranged in the upper edge of said container.

3. A device for simply roasting coffee beans as set forth in claim 2, wherein said handle is mounted to said reinforcing core member.

4. A device for simply roasting coffee beans as set forth in claim 1, wherein said container has an internal surface which is coated with ceramics.

5. A device for simply roasting coffee beans as set forth in claim 1, wherein said transparent material comprises a transparent, moistureproof cellophane.

6. A device for simply roasting coffee beans as set forth in claim 5, wherein said cutout means comprises a seal bonded to said cellophane.

7. A device for simply roasting coffee beans as set forth in claim 1, wherein said cover is provided in a portion thereof with a temperature display means for displaying temperatures within said container.

8. A device for roasting coffee beans according to claim 1, wherein said handle can be moved over said cover so that it does not extend externally of said container.

9. A device for roasting said coffee beans according to claim 1, said device being a package consisting essentially of said container, said cover, said handle and said coffee beans.

10. A method for simply roasting coffee beans, comprising the sequential steps of: storing said coffee beans in the hermetically covered container recited in claim 1; swinging and heating said hermetically covered container; opening a ventilation hole in said cover by removing said cutout means in said cover after generation of bursting sounds of said coffee beans due to said heating; and, while discharging out smoke from within said container externally through said ventilation hole, further swinging and heating said container while observing said beans through said cover for a time sufficient to roast said coffee beans to the desired color.

11. A method for simply roasting coffee beans as set forth in claim 10, wherein said coffee beans have previously been semi-roasted.

12. A method for roasting coffee beans as set forth in claim 10, wherein said container is heated by means of a gas heater.

13. A method for simply roasting coffee beans as set forth in claim 12, wherein said coffee beans are first roasted by placing the bottom surface of said container at a position about 3 cm above and apart from the strong flame of said gas heater and, after said coffee beans are colored due to said roasting, said container bottom surface is then moved up to a position about 5 or 6 cm above and apart form the strong flame of said gas heater and, after said coffee beans are colored due to said roasting, said container bottom surface is then moved up to a position about 5 or 6 cm above and apart from the strong flame of said gas heater for further roasting of said coffee beans.

* * * * *